(12) United States Patent　(10) Patent No.: US 11,415,018 B2
Nishiyama　(45) Date of Patent: Aug. 16, 2022

(54) VALVE DEVICE AND STEAM TURBINE

(71) Applicant: MITSUBISHI HEAVY INDUSTRIES COMPRESSOR CORPORATION, Tokyo (JP)

(72) Inventor: Kenichi Nishiyama, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 417 days.

(21) Appl. No.: 16/794,465

(22) Filed: Feb. 19, 2020

(65) Prior Publication Data

US 2020/0271009 A1　Aug. 27, 2020

(30) Foreign Application Priority Data

Feb. 25, 2019　(JP) ............................. JP2019-031740

(51) Int. Cl.
| | |
|---|---|
| *F01D 17/14* | (2006.01) |
| *F16K 31/44* | (2006.01) |
| *F01D 17/10* | (2006.01) |
| *F01D 17/18* | (2006.01) |
| *F01D 25/24* | (2006.01) |

(52) U.S. Cl.
CPC ............ *F01D 17/145* (2013.01); *F16K 31/44* (2013.01); *F01D 17/10* (2013.01); *F01D 17/18* (2013.01); *F01D 25/24* (2013.01); *F05D 2220/31* (2013.01); *F05D 2220/72* (2013.01); *Y10T 137/87917* (2015.04)

(58) Field of Classification Search
CPC ........ F01D 17/145; F01D 25/24; F01D 17/18; F01D 17/10; F16K 31/44; F05D 2220/31; F05D 2220/72; Y10T 137/87917
See application file for complete search history.

(56) References Cited

U.S. PATENT DOCUMENTS 2,147,874 A * 2/1939 Zetterquist .............. F01D 17/18
415/151
2,192,193 A * 3/1940 Johnson ............... G05D 23/125
137/630.19

(Continued)

FOREIGN PATENT DOCUMENTS

JP　　　　2010048216 A　　3/2010

*Primary Examiner* — Matthew W Jellett
*Assistant Examiner* — Christopher D Ballman
(74) *Attorney, Agent, or Firm* — Osha Bergman Watanabe & Burton LLP (57) ABSTRACT

A valve device includes a valve casing 21, an intermediate rod portion 29, and an intermediate actuator unit 30. In the valve casing 21, a rod insertion hole into which the intermediate rod portion 29 can be inserted is formed. The intermediate actuator unit 30 includes a hydraulic cylinder that causes a piston rod portion to advance and retreat in a direction orthogonal to a second center axis direction D2. The hydraulic cylinder includes a rod guide portion that guides movement of the piston rod portion. A gap between an inner circumferential surface of the rod insertion hole and an outer circumferential surface of the intermediate rod portion 29 is formed to be wider than a gap between an inner circumferential surface of the rod guide portion and an outer circumferential surface of the piston rod portion.

6 Claims, 5 Drawing Sheets

(56) References Cited

U.S. PATENT DOCUMENTS

| | | | | |
|---|---|---|---|---|
| 2,385,537 A * | 9/1945 | Pentheny | ................ | F01D 17/18 |
| | | | | 251/14 |
| 3,642,381 A * | 2/1972 | Wickl | .................... | F01D 17/18 |
| | | | | 415/151 |
| 3,703,183 A * | 11/1972 | Worthen | ................ | G05D 13/00 |
| | | | | 251/64 |
| 3,763,894 A * | 10/1973 | Meyer | .................... | F01D 17/18 |
| | | | | 251/333 |
| 3,958,600 A * | 5/1976 | Kalb | .................... | F01D 17/145 |
| | | | | 251/29 |
| 4,235,416 A * | 11/1980 | LaCoste | ................. | F16K 1/482 |
| | | | | 251/86 |
| 4,456,032 A * | 6/1984 | Straslicka | ............... | F01D 17/18 |
| | | | | 415/155 |
| 4,850,793 A * | 7/1989 | Silvestri, Jr. | ............ | F01D 17/18 |
| | | | | 415/38 |
| 5,277,403 A * | 1/1994 | Waggott | ................ | F01D 17/145 |
| | | | | 251/324 |
| 5,823,742 A * | 10/1998 | Giddings | ................ | F01D 17/18 |
| | | | | 415/150 |
| 6,099,246 A * | 8/2000 | Lochner | ................. | F01D 17/18 |
| | | | | 415/214.1 |
| 7,604,021 B2 * | 10/2009 | Ootomo | ................ | F01D 17/145 |
| | | | | 137/625.3 |
| 9,347,336 B2 * | 5/2016 | Ito | ........................ | F01D 17/145 |
| 10,227,898 B2 * | 3/2019 | Kawashima | ...... | F16K 31/52408 |
| 10,605,114 B2 * | 3/2020 | Nogami | .................. | F16K 31/44 |
| 10,774,671 B2 * | 9/2020 | Kamimura | ............. | F16K 27/02 |
| 10,781,712 B2 * | 9/2020 | Nakamura | ........... | F01D 17/145 |
| 2017/0328233 A1 * | 11/2017 | Hamamoto | ............ | F01D 17/10 |
| 2018/0283177 A1 * | 10/2018 | Bini | ........................ | F01D 5/043 |
| 2019/0234230 A1 * | 8/2019 | Nishiyama | ........... | F01D 17/145 |

* cited by examiner

VALVE DEVICE AND STEAM TURBINE

BACKGROUND OF THE INVENTION

Field of the Invention

The present invention relates to a valve device and a steam turbine.

Priority is claimed on Japanese Patent Application No. 2019-031740, filed on Feb. 25, 2019, the content of which is incorporated herein by reference.

Description of Related Art

A steam turbine rotates and drives a rotor by means of steam supplied from a boiler. The steam turbine transmits the rotation of the rotor to operate a compressor or a generator.

In the steam turbine, an adjusting valve or a stop valve is provided to supply steam from the boiler to a turbine main body. The flow rate of steam supplied to the turbine main body can be adjusted by adjusting the opening degree of the adjusting valve. In addition, at the time of a normal operation of the steam turbine, the stop valve is in an opened state. Accordingly, steam is supplied to the turbine main body from the boiler through a steam supply pipe. In addition, in the case where an abnormality occurs in the steam turbine, the stop valve enters a closed state and supply of steam from the boiler to the turbine main body is stopped.

In Japanese Unexamined Patent Application, First Publication No. 2010-48216, a valve device in which such an adjusting valve and such a stop valve are integrated with each other is described. In the valve device, a main steam stop valve, which is a stop valve, and a steam-regulating valve, which is an adjusting valve, are orthogonally connected to each other. Specifically, a valve rod of the main steam stop valve is movable in a horizontal direction and a valve rod of the steam-regulating valve is movable in a vertical direction.

SUMMARY OF THE INVENTION

However, in such a valve device, an actuator such as a hydraulic cylinder for moving a rod (valve rod) of the main steam stop valve in the horizontal direction is provided to protrude at an outer side of the valve rod in the horizontal direction. As a result, the valve device becomes large in the horizontal direction. On the contrary, for example, in the case where a structure in which the rod of the main steam stop valve is movable in the vertical direction while being parallel to the rod of the steam-regulating valve is adopted, the shapes of a flow path of the main steam stop valve and a flow path of the steam-regulating valve, which are formed in a valve casing, become complicated by being curved a plurality of times. As a result, there is a deterioration in assembling property at the time of incorporation of a valve seat, a valve body, or the like to be disposed in the valve casing. Therefore, it is necessary to secure the assembling property by adopting a structure which is obtained by integrally fixing a valve casing of the steam-regulating valve and a valve casing of a main steam valve to each other by means of welding after creating the valve casings separately from each other, or the like.

In addition, it is desirable that the rod be moved smoothly without use of the rod's own weight when the rod of the main steam stop valve is moved in the horizontal direction. As a structure for the above-described point, a structure in which a guide with a very narrow clearance in a direction intersecting the horizontal direction is provided with respect to the rod such that the valve rod is moved only in the horizontal direction is conceivable. However, there is a possibility that scale adheres to the rod due to the influence of steam flowing in the valve device. Therefore, there is a possibility that a region around the rod with a narrow clearance is clogged with the scale and the movement of the rod is impeded. Therefore, it is desirable to secure stable movement of the rod while securing an assembling property.

The present invention provides a valve device and a steam turbine with which it is possible to secure stable movement of a rod while securing an assembling property.

According to a first aspect of the present invention, a valve device is provided, including a valve casing in which an inlet flow path into which fluid is configured to flow, an intermediate flow path that communicates with the inlet flow path and through which the fluid is configured to flow in a direction intersecting the inlet flow path, and an outlet flow path that communicates with the intermediate flow path and through which the fluid is configured to flow in a direction intersecting the intermediate flow path are formed, an outlet valve seat portion provided in the outlet flow path, an outlet valve body that comes into contact with the outlet valve seat portion such that the outlet flow path is closed, an outlet rod portion that extends along a first center axis and of which an end portion on a first side in a first center axis direction is connected to the outlet valve body, a linkage shaft portion that is configured to linearly move the outlet rod portion in the first center axis direction, an intermediate valve seat portion provided in the intermediate flow path, an intermediate valve body that comes into contact with the intermediate valve seat portion such that the intermediate flow path is closed, an intermediate rod portion that extends along a second center axis intersecting the first center axis and of which an end portion on a first side in a second center axis direction is connected to the intermediate valve body, and an intermediate actuator unit that is configured to linearly move the intermediate rod portion in the second center axis direction in which the intermediate actuator unit includes a hydraulic cylinder that is configured to cause a piston rod portion to advance and retreat in a direction orthogonal to the second center axis direction, and a linking unit that connects the intermediate rod portion and the piston rod portion to each other, converts displacement of the piston rod portion into displacement in the second center axis direction, and transmits the displacement to the intermediate rod portion such that the intermediate rod portion is moved in the second center axis direction, a rod insertion hole into which the intermediate rod portion is inserted is formed in the valve casing, the hydraulic cylinder includes a cylinder portion in which control oil is accommodated, and a rod guide portion that has a tubular shape into which the piston rod portion is inserted and guides movement of the piston rod portion, and a gap between an inner circumferential surface of the rod insertion hole and an outer circumferential surface of the intermediate rod portion is formed to be wider than a gap between an inner circumferential surface of the rod guide portion and an outer circumferential surface of the piston rod portion.

According to such a configuration, in comparison with the case where the piston rod portion moving in the second center axis direction is connected to an outer side of an end portion of the intermediate rod portion in the second center axis direction, it is possible to suppress the size of the valve device in the second center axis direction. In addition, since the intermediate flow path is formed to intersect the outlet flow path, it is possible to simplify the shape of a space inside the valve casing in comparison with the case where the intermediate flow path and the outlet flow path are provided to be parallel with each other. Therefore, it is possible to improve an assembling property at the time of incorporation of the outlet valve seat portion, the outlet valve body, or the like into the valve casing. Furthermore, the intermediate rod portion is inserted into the rod insertion hole, which is formed in a lid portion, in a wobbling state. Therefore, movement of the intermediate rod portion being impeded due to adhesion of scale is suppressed. As a result, it is possible to secure stable movement of the intermediate rod portion. Furthermore, a portion of the piston rod portion is disposed inside the cylinder portion. Therefore, the piston rod portion is exposed to the control oil. As a result, the control oil adheres to the outer circumferential surface of the piston rod portion and thus sliding characteristics are significantly enhanced. Therefore, even when there is almost no gap between the inner circumferential surface of the rod guide portion and the outer circumferential surface of the piston rod portion, high slidability can be secured between the rod guide portion and the piston rod portion. Accordingly, it is possible to stably move the piston rod portion in a vertical direction with high accuracy.

A second aspect of the present invention provides the valve device according to the first aspect in which at least a portion of the rod guide portion may be disposed inside the cylinder portion.

According to such a configuration, the rod guide portion is exposed to the control oil in the cylinder portion. As a result, the control oil also adheres to the inner circumferential surface of the rod guide portion. Therefore, sliding characteristics are improved not only at the outer circumferential surface of the piston rod portion but also at the inner circumferential surface of the rod guide portions. Accordingly, even when there is almost no gap between the inner circumferential surface of the rod guide portion and the outer circumferential surface of the piston rod portions, significantly high slidability can be secured between the rod guide portion and the piston rod portion. Therefore, it is possible to more stably move the piston rod portion in the vertical direction with high accuracy.

A third aspect of the present invention provides the valve device according to the first aspect or the second aspect in which the valve casing may include a first surface in which the rod insertion hole is formed at a position facing the intermediate valve seat portion, the intermediate valve body may include a valve body rear surface that faces the first surface and to which the intermediate rod portion is connected, and a projection portion that has a tubular shape surrounding a center axis of the intermediate rod portion and protrudes toward the first surface from the valve body rear surface, and the projection portion may come into contact with the first surface when the intermediate rod portion is moved such that the intermediate flow path is opened.

According to such a configuration, when the intermediate rod portion is moved such that the intermediate flow path is opened, an opening of the rod insertion hole at the first surface is surrounded by the projection portion brought into close contact with the first surface and the valve body rear surface. In other words, the projection portion serves as a sealing portion between the lid portion and the intermediate valve body. Accordingly, even when the intermediate flow path is opened and the fluid flows into a valve casing main body, inflow of the fluid into the rod insertion hole can be suppressed. As a result, the fluid inside the valve casing main body can be restrained from leaking out from the valve casing main body via the rod insertion hole.

A fourth aspect of the present invention provides the valve device according to any of the first aspect to the third aspect in which the intermediate valve body may include a slave valve body portion that is fixed to a tip end of the intermediate rod portion, a main valve body portion in which an accommodation space accommodating the slave valve body portion is formed and that includes a valve body throughhole through which the accommodation space and the outlet flow path communicate with each other, and a slave valve body guide portion that is fixed to the main valve body portion and guides movement of the slave valve body portion in the accommodation space, and a centroid of the main valve body portion may be positioned to overlap the slave valve body guide portion in a movement direction of the slave valve body portion.

According to such a configuration, the position of the centroid of the main valve body portion overlaps the slave valve body guide portion. Therefore, even when the intermediate rod portion is moved and the position of the slave valve body portion relative to the slave valve body guide portion is shifted, the position of the centroid of the main valve body portion do not become offset from the position of the slave valve body guide portion at all times. In other words, a state where the slave valve body portion is stably supported with respect to the slave valve body guide portion can be maintained. As a result, it is possible to prevent the main valve body portion from being inclined with respect to the slave valve body portion. Accordingly, it is possible to stably close the intermediate flow path by means of the intermediate valve body.

A fifth aspect of the present invention provides the valve device according to any of the first aspect to the fourth aspect in which the linking unit may include an intermediate rod-fixing portion to which the intermediate rod portion is fixed, and the intermediate rod-fixing portion may include a first fixation hole that is formed such that an inner circumferential surface thereof comes into sliding contact with the outer circumferential surface of the intermediate rod portion, and a second fixation hole that is recessed from a bottom portion of the first fixation hole and to which a base end portion of the intermediate rod portion is fixed.

According to such a configuration, the intermediate rod portion is fixed to the second fixation hole formed at a deeper position than the first fixation hole in a state of being inserted into the first fixation hole. Therefore, even if the base end portion of the intermediate rod portion is broken or the like and the base end portion of the intermediate rod portion and the second fixation hole fixed to each other are released from each other, the intermediate rod portion remains inserted into the first fixation hole. Therefore, the intermediate rod portion is restrained from falling out from the intermediate rod-fixing portion.

According to a sixth aspect of the present invention, a steam turbine is provided, including the valve device according to any one of the first aspect to the fifth aspect and a turbine main body that is driven by means of steam supplied from the valve device.

According to the present invention, it is possible to secure stable movement of a rod while securing an assembling property.

DETAILED DESCRIPTION OF THE INVENTION

Hereinafter, an embodiment of the present invention will be described with reference to FIGS. 1 to 5.

Figure 1:
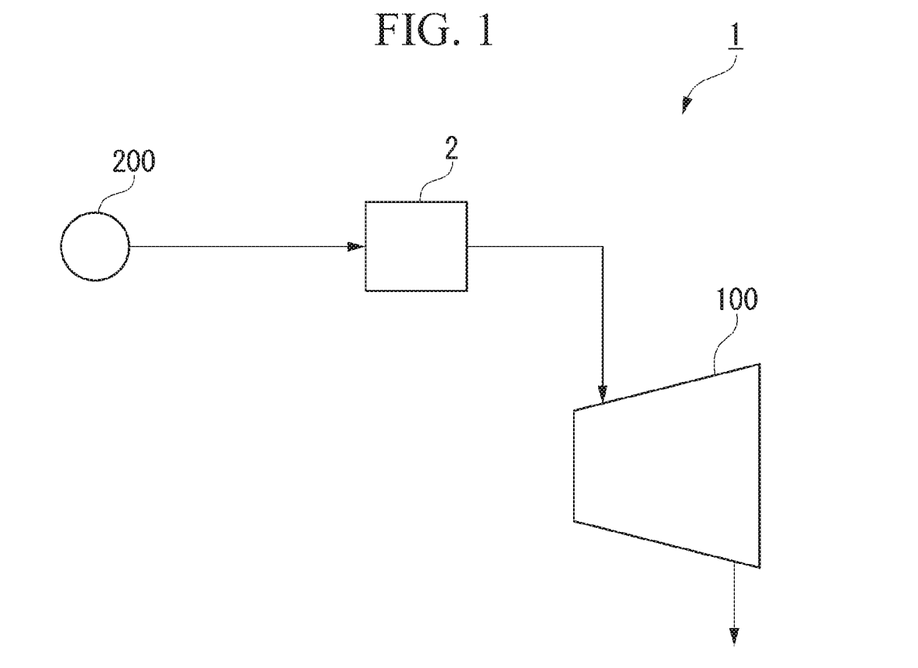
FIG. 1 is a schematic view illustrating the entire configuration of a steam turbine configured by using a stop valve according to an embodiment of the present invention.

As shown in FIG. 1, a steam turbine 1 according to the present embodiment is provided with a turbine main body 100 and a valve device 2.

Steam (fluid) is supplied to the turbine main body 100 from a steam supply source 200 such as a boiler. In the turbine main body 100, a rotor (not shown) that is rotatably provided in a casing (not shown) is rotated and driven by the supplied steam. The rotation of the rotor (not shown) is transmitted to, for example, a generator via an output shaft, so that power is generated.

Figure 2:
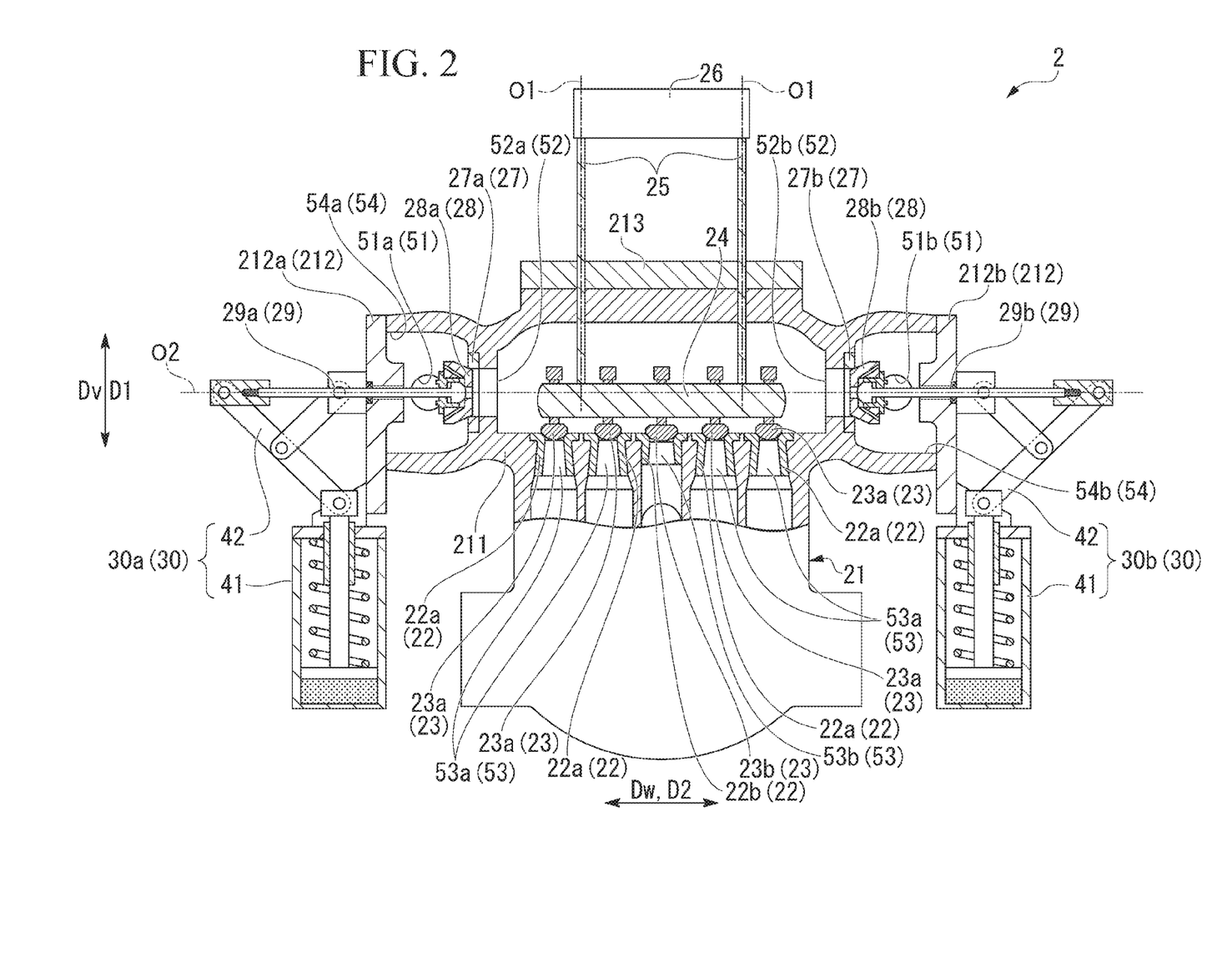
FIG. 2 is a schematic sectional view illustrating a valve device according to the embodiment of the present invention.

The valve device 2 is a composite valve obtained by integrating an adjusting valve (governing valve: GV), a stop valve (trip valve: TV), and an overload valve with each other. The valve device 2 is provided on the side of an inlet of the turbine main body 100 and adjusts the amount of steam supplied to the turbine main body 100. As shown in FIG. 2, the valve device 2 is provided with a valve casing 21, outlet valve seat portions 22, outlet valve bodies 23, an inner bar 24, outlet rod portions 25, a linkage shaft portion 26, intermediate valve seat portions 27, intermediate valve bodies 28, intermediate rod portions 29, and intermediate actuator units 30.

Inside the valve casing 21, a space serving as a flow path through which steam flows is formed. The valve casing 21 in the present embodiment includes a valve casing main body 211, lateral lid portions (lid portion) 212, and an upper lid portion 213.

In the valve casing main body 211, inlet flow paths 51, intermediate flow paths 52, outlet flow paths 53, and external opening portions 54 are formed. In the valve casing main body 211, a space through which steam flows from the inlet flow paths 51 to the outlet flow paths 53 via the intermediate flow paths 52 is formed.

The inlet flow paths 51 are opening portions into each of which steam flowing from an upstream side flows. The inlet flow paths 51 are connected to lines such as pipes connected to the steam supply source 200. In the present embodiment, as the inlet flow paths 51, a first inlet flow path 51a and a second inlet flow path 51b are provided. The first inlet flow path 51a and the second inlet flow path 51b are formed to be separated from each other in a width direction (horizontal direction) Dw of the valve device 2. In other words, to the valve device 2 in the present embodiment, steam is supplied via two inlet flow paths 51.

The intermediate flow paths 52 communicate with the inlet flow paths 51 and through the intermediate flow paths 52, steam flows in a direction intersecting the inlet flow paths 51. The intermediate flow paths 52 in the present embodiment are formed to be orthogonal to the inlet flow paths 51. The intermediate flow paths 52 are formed inward of the inlet flow paths 51 in the width direction Dw. Steam flowing into the intermediate flow paths 52 from the inlet flow paths 51 flows to an inner side in the width direction Dw. In the present embodiment, as the intermediate flow paths 52, a first intermediate flow path 52a that is formed at a position close to the first inlet flow path 51a and a second intermediate flow path 52b that is formed at a position close to the second inlet flow path 51b are provided.

The outlet flow paths 53 communicate with the intermediate flow paths 52 and through the outlet flow paths 53, and steam flows in a direction intersecting the intermediate flow paths 52. The outlet flow paths 53 are connected to lines such as pipes connected to the turbine main body 100. The outlet flow paths 53 in the present embodiment are formed to be orthogonal to the inlet flow paths 51 and the intermediate flow paths 52. The outlet flow paths 53 are formed inward of the intermediate flow paths 52 in the width direction Dw. Steam flowing into the outlet flow paths 53 from the intermediate flow paths 52 flows to a lower side in a vertical direction Dv. A plurality of the outlet flow paths 53 are provided to be separated from each other in the width direction Dw. In the present embodiment, as the outlet flow paths 53, a plurality of (four in present embodiment) first outlet flow paths 53a and one second outlet flow path 53b are provided.

The plurality of first outlet flow paths 53a are formed to be arranged while being separated from each other in the width direction Dw. The second outlet flow path 53b is formed at the center in the width direction Dw to be interposed between the first outlet flow paths 53a.

The external opening portions 54 are formed to have a size such that the intermediate valve bodies 28, which will be described later, can be inserted thereinto. The external opening portions 54 are opened to communicate with the outside at positions that the intermediate flow paths 52 face. The external opening portions 54 in the present embodiment are formed to be orthogonal to the inlet flow paths 51 and the outlet flow paths 53. The external opening portions 54 are formed outward of the inlet flow paths 51 in the width direction Dw. In other words, the external opening portions 54 are formed to be opposite the intermediate flow paths 52 in the width direction Dw with the inlet flow paths 51 interposed therebetween. The external opening portions 54 are formed such that the positions thereof in the vertical direction Dv overlap the intermediate flow paths 52 and the inlet flow paths 51. In the present embodiment, as the external opening portions 54, a first external opening portion 54a that is formed at a position close to the first inlet flow path 51a and a second external opening portion 54b that is formed at a position close to the second inlet flow path 51b are provided. The first external opening portion 54a, the second external opening portion 54b, the first intermediate flow path 52a, and the second intermediate flow path 52b are formed at the same position in the vertical direction Dv. As a result, when the inside of the valve casing main body 211 is seen from the outside, the first external opening portion 54a and the second external opening portion 54b communicate with each other straightly in the width direction Dw.

Figure 3:
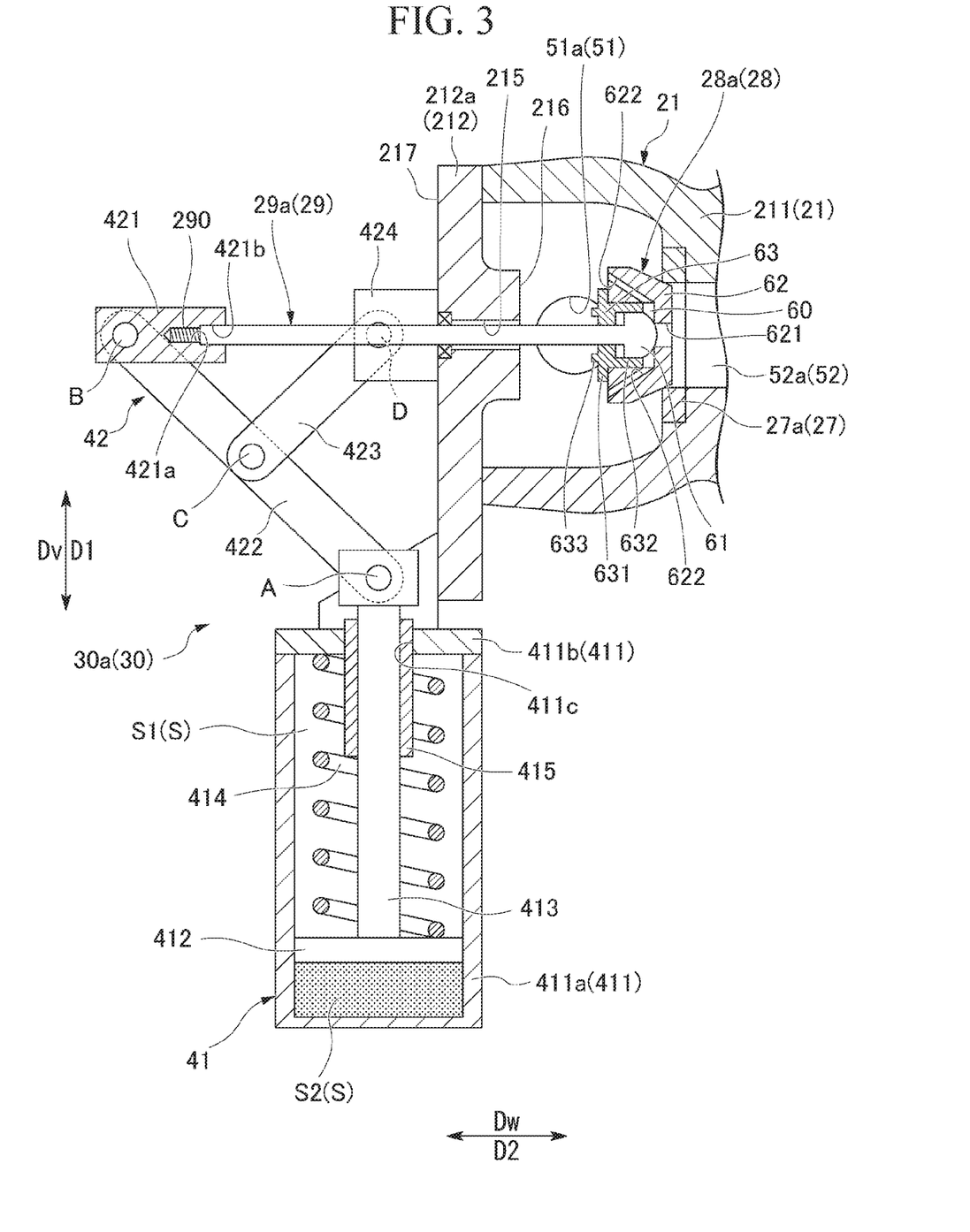
FIG. 3 is a main part enlarged view showing a fully closed state of the valve device according to the embodiment.

The lateral lid portions 212 are fixed to the valve casing main body 211 such that the external opening portions 54 are closed. The lateral lid portions 212 are fixed to the valve casing main body 211 by means of fixing tools such as bolts (not shown). As shown in FIG. 3, the lateral lid portion 212 in the present embodiment is a disc-shaped member that is provided with a rod insertion hole 215, into which the intermediate rod portion 29 which will be described later can be inserted, formed at the center thereof. The lateral lid portion 212 includes a lid portion inner surface (first surface)

216 and a lid portion outer surface 217. The lid portion inner surface 216 is a surface that faces the intermediate flow path 52 in a state where the lateral lid portion 212 is fixed to the valve casing main body 211. The lid portion outer surface 217 is a surface that faces a side opposite to the lid portion inner surface 216 in the width direction Dw in a state where the lateral lid portion 212 is fixed to the valve casing main body 211. In other words, the lid portion outer surface 217 faces the outside of the valve casing 21. The rod insertion hole 215 penetrates from the lid portion inner surface 216 to the lid portion outer surface 217. The rod insertion hole 215 is formed at a position facing the intermediate valve seat portion 27, which will be described later. Note that, a member such as a guide-bush may be fitted into the rod insertion hole 215. In the present embodiment, as the lateral lid portions 212, a first lateral lid portion 212a that closes the first external opening portion 54a and a second lateral lid portion 212b that closes the second external opening portion 54b are provided.

The outlet valve seat portions 22 are provided in the outlet flow paths 53. A plurality of the outlet valve seat portions 22 are provided to respectively correspond to the plurality of the outlet flow paths 53. In the present embodiment, as the outlet valve seat portions 22, first outlet valve seat portions 22a that are respectively provided in the first outlet flow paths 53a and a second outlet valve seat portion 22b that is provided in the second outlet flow path 53b are provided.

The outlet valve bodies 23 come into contact with the outlet valve seat portions 22 such that the outlet flow paths 53 are closed. A plurality of the outlet valve bodies 23 are provided to respectively correspond to the outlet valve seat portions 22 which are provided in the plurality of outlet flow paths 53. In the present embodiment, as the outlet valve bodies 23, first outlet valve bodies 23a that come into contact with the first outlet valve seat portions 22a and a second outlet valve body 23b that comes into contact with the second outlet valve seat portion 22b are provided. The first outlet valve bodies 23a can be moved upward in the vertical direction Dv while exiting a state of being in contact with the first outlet valve seat portions 22a. The second outlet valve body 23b can be moved upward in the vertical direction Dv while exiting a state of being in contact with the second outlet valve seat portion 22b.

The inner bar 24 is connected to the outlet valve bodies 23 and the outlet rod portions 25. The inner bar 24 moves the plurality of outlet valve bodies 23 together. The inner bar 24 in the present embodiment holds a plurality of the first outlet valve bodies 23a and the second outlet valve body 23b. The inner bar 24 is formed to have a size such that the inner bar 24 can be inserted through the intermediate flow paths 52 and the external opening portions 54. Specifically, the inner bar 24 has a thick plate-like shape that is thick in the vertical direction Dv and extends in the width direction Dw. The sectional area of the inner bar 24 in the vertical direction Dv is smaller than the opening areas of the external opening portions 54 and the intermediate flow paths 52.

The outlet rod portions 25 extend along a first center axis O1. End portions of the outlet rod portions 25 that are on a first side in a first center axis direction D1 are connected to the outlet valve bodies 23. Here, the first center axis direction D1 is a direction in which the first center axis O1 extends and in the present embodiment, the first center axis direction D1 is the vertical direction Dv. In addition, the first side in the first center axis direction D1 is a lower side in the vertical direction Dv and a second side in the first center axis direction D1 is an upper side in the vertical direction Dv. In the present embodiment, a plurality of (two in present embodiment) the outlet rod portions 25 are provided to be separated from each other in the width direction Dw. The end portions of the outlet rod portions 25 that are on a first side in the vertical direction Dv are indirectly connected to the outlet valve bodies 23 via the inner bar 24.

The linkage shaft portion 26 linearly moves the outlet rod portions 25 in the first center axis direction D1. The linkage shaft portion 26 in the present embodiment moves the outlet rod portions 25 by means of a hydraulic cylinder and an E/H actuator, which use control oil, or an air cylinder, which uses steam, such that the inner bar 24 is moved in the vertical direction Dv. Accordingly, the plurality of first outlet valve bodies 23a and the second outlet valve body 23b are moved in the vertical direction Dv.

The intermediate valve seat portions 27 are provided in the intermediate flow paths 52. In the present embodiment, as the intermediate valve seat portions 27, a first intermediate valve seat portion 27a that is provided in the first intermediate flow path 52a and a second intermediate valve seat portion 27b that is provided in the second intermediate flow path 52b are provided.

The intermediate rod portions 29 extend along a second center axis O2 that intersects the first center axis O1. The intermediate rod portion 29 have columnar shapes with the second center axis O2 as the center thereof. End portions of the intermediate rod portions 29 that are on a first side in a second center axis direction D2 are connected to the intermediate valve bodies 28. Here, the second center axis direction D2 is a direction in which the second center axis O2 extends and in the present embodiment, the second center axis direction D2 is the width direction Dw, which is a direction orthogonal to the first center axis direction D1. In addition, the first side in the second center axis direction D2 is an inner side in the width direction Dw and is a side at which the outlet flow paths 53 are formed, with respect to the intermediate flow paths 52. In addition, second sides in the first center axis direction D1 are outer sides in the width direction Dw and are sides at which the external opening portions 54 are formed, with respect to the intermediate flow paths 52. The intermediate rod portions 29 are inserted into the rod insertion holes 215. Outer circumferential surfaces of the intermediate rod portions 29 are disposed with gaps formed between the outer circumferential surfaces and inner circumferential surfaces of the rod insertion holes 215. End portions (base end portions 290) of the intermediate rod portions 29 that are on the outer sides in the width direction Dw are positioned outside the valve casing 21. End portions (Lip end portions) of the intermediate rod portions 29 that are on the inner side in the width direction Dw are positioned inside the valve casing 21. The base end portions 290 of the intermediate rod portions 29 that are positioned outside the valve casing 21 are screw portions on which spiral grooves are formed. The intermediate rod portions 29 are supported by linking units 42, which will be described later, such that the intermediate rod portions 29 can be slid in the width direction Dw. In the present embodiment, as the intermediate rod portions 29, a first intermediate rod portion 29a on the first intermediate valve seat portion 27a side and a second intermediate rod portion 29b on the second intermediate valve seat portion 27b side are provided. The first intermediate rod portion 29a and the second intermediate rod portion 29b have the same shape as each other and are disposed to face opposite sides in the width direction Dw.

Figure 4:
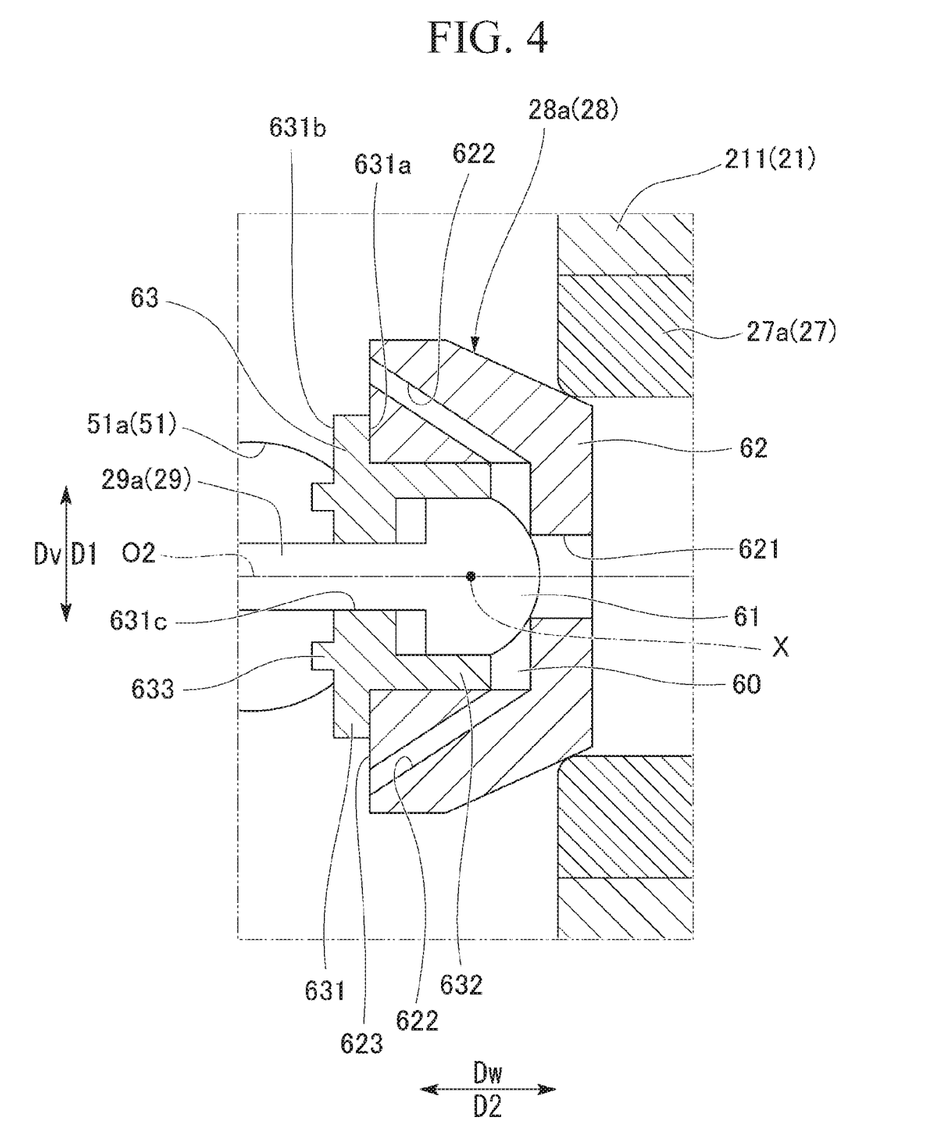
FIG. 4 is a main part enlarged view of the vicinity of an outlet valve body according to the embodiment.

The intermediate valve bodies 28 come into contact with the intermediate valve seat portions 27 such that the intermediate flow paths 52 are closed. The intermediate valve bodies 28 are connected to the tip end portions of the intermediate rod portions 29. As shown in FIG. 4, the intermediate valve body 28 includes a slave valve body portion 61, a main valve body portion 62, and a slave valve body guide portion 63.

The slave valve body portion 61 is fixed to the tip end portion of the intermediate rod portion 29. The slave valve body portion 61 has a columnar shape with the second center axis O2 as the center thereof and a tip end surface of the slave valve body portion 61 that faces the intermediate valve seat portion 27 is a spherical surface.

The main valve body portion 62 can come into contact with the intermediate valve seat portion 27. The main valve body portion 62 has a disc-like shape with the second center axis O2 as the center thereof. The outer diameter of the main valve body portion 62 is larger than that of the slave valve body portion 61. The main valve body portion 62 is formed such that the outer diameter thereof decreases toward the intermediate valve seat portion 27. Specifically, a portion of an outer circumferential surface of the main valve body portion 62 is a tapered surface that becomes closer to the second center axis O2 toward the intermediate valve seat portion 27. The main valve body portion 62 closes the intermediate flow path 52 by causing the tapered surface to come into contact with the intermediate valve seat portion 27. Inside the main valve body portion 62, an accommodation space 60 in which the slave valve body portion 61 can be accommodated is formed. The accommodation space 60 is a recessed portion that is recessed from a main valve body surface 623 (surface facing external opening portion 54) that faces a side opposite to a surface of the main valve body portion 62 that faces the intermediate valve seat portion 27. The position of a centroid X of the main valve body portion 62 is a position that overlaps the accommodation space 60 in the width direction Dw. In the main valve body portion 62, a first valve body through-hole (valve body through-hole) 621 through which the accommodation space 60 and the outlet flow paths 53 communicate with each other and a second valve body through-hole 622 through which the accommodation space 60 and the inlet flow path 51 communicate with each other are formed.

The first valve body through-hole 621 penetrates the main valve body portion 62 such that a space connected to the outlet flow paths 53 and the accommodation space 60 communicate with each other. The first valve body through-hole 621 is open in a bottom surface of the recessed portion that forms the accommodation space 60. Specifically, the first valve body through-hole 621 penetrates the main valve body portion 62 in the width direction Dw at a position facing the tip end surface of the slave valve body portion 61. The first valve body through-hole 621 is closed when coming into contact with the tip end surface of the slave valve body portion 61.

The second valve body through-hole 622 penetrates the main valve body portion 62 such that a space connected to the inlet flow path 51 and the accommodation space 60 communicate with each other. The second valve body through-hole 622 is open in a side surface of the recessed portion that forms the accommodation space 60. The second valve body through-hole 622 is open in the main valve body surface 623. The second valve body through-hole 622 penetrates the main valve body portion 62 from the accommodation space 60 to the main valve body surface 623 while being inclined with respect to the second center axis O2. The second valve body through-hole 622 is formed at a position at which the second valve body through-hole 622 is in an opened state at all times regardless of the position of the slave valve body portion 61 or the main valve body portion 62.

The slave valve body guide portion 63 guides the movement of the slave valve body portion 61 in the width direction Dw, inside the accommodation space 60. The slave valve body guide portion 63 is fixed to the main valve body portion 62 such that the accommodation space 60 is closed. The slave valve body guide portion 63 includes a slave valve body guide main body 631, a guide tubular portion 632, and a projection portion 633.

The slave valve body guide main body 631 has a plate-like shape that extends in directions orthogonal to the intermediate rod portion 29. The slave valve body guide main body 631 is fixed to the main valve body portion 62 such that the accommodation space 60 is defined as a closed space. The slave valve body guide main body 631 is fixed to the main valve body portion 62 from a side opposite to the first valve body through-hole 621 with the accommodation space 60 interposed therebetween. The slave valve body guide main body 631 includes a guide front surface 631a that closes the accommodation space 60 and a guide rear surface (valve body rear surface) 631b that faces a side opposite to the guide front surface 631a in the width direction Dw. In the slave valve body guide main body 631, a valve body rod insertion hole 631c into which the intermediate rod portion 29 can be inserted is formed. The valve body rod insertion hole 631c penetrates the slave valve body guide main body 631 in the width direction Dw from the guide front surface 631a to the guide rear surface 631b. The valve body rod insertion hole 631c is formed to have a size such that a slight gap is formed between an inner circumferential surface thereof and a side surface of the intermediate rod portion 29.

The guide tubular portion 632 protrudes in a tubular shape from the guide front surface 631a so as to surround the valve body rod insertion hole 631c. The guide tubular portion 632 is disposed in the accommodation space 60 with the slave valve body guide main body 631 fixed to the main valve body portion 62. An inner circumferential surface of the guide tubular portion 632 is in sliding contact with an outer surface of the slave valve body portion 61. The guide tubular portion 632 extends up to a position such that an opening of the second valve body through-hole 622 is not closed with the slave valve body guide main body 631 fixed to the main valve body portion 62. The guide tubular portion 632 extends up to a position that is closer to the first valve body through-hole 621 than the position of the centroid X of the main valve body portion 62 in the second center axis direction D2.

The projection portion 633 protrudes in a tubular shape from the guide rear surface 631b so as to surround the valve body rod insertion hole 631c. The projection portion 633 protrudes in the width direction Dw to a side opposite to the guide tubular portion 632 with respect to the slave valve body guide main body 631.

In the present embodiment, as the intermediate valve bodies 28, a first intermediate valve body 28a and a second intermediate valve body 28b are provided. The first intermediate valve body 28a is connected to the first intermediate rod portion 29a and comes into contact with the first intermediate valve seat portion 27a. The second intermediate valve body 28b is connected to the second intermediate rod portion 29b and comes into contact with the second intermediate valve seat portion 27b. The first intermediate valve body 28a can be moved outward in the width direction Dw while exiting a state of being in contact with the first intermediate valve seat portion 27a. The second intermediate valve body 28b can be moved outward in the width direction Dw while exiting a state of being in contact with the second intermediate valve seat portion 27b.

The intermediate actuator units 30 linearly move the intermediate rod portions 29 in the second center axis direction D2. The intermediate actuator units 30 converts a linear motion in the first center axis direction D1 into a linear motion in the second center axis direction D2 to linearly move the intermediate rod portions 29 in the second center axis direction D2. The intermediate actuator units 30 in the present embodiment include a first intermediate actuator unit 30a that moves the first intermediate rod portion 29a and a second intermediate actuator unit 30b that moves the second intermediate rod portion 29b. Each of the first intermediate actuator unit 30a and the second intermediate actuator unit 30b includes a drive unit 41 and the linking unit 42.

The first intermediate actuator unit 30a and the second intermediate actuator unit 30b have the same configuration as each other except for a point that directions in which the intermediate rod portions 29 are moved are opposite to each other in the second center axis direction D2 (width direction Dw). Therefore, in the present embodiment, description will be made by using the drive unit 41 and the linking unit 42 of the first intermediate actuator unit 30a as an example.

As shown in FIG. 3, the drive unit 41 causes a linearly moving member to advance and retreat in the vertical direction Dv, which is a direction orthogonal to the second center axis direction D2. The drive unit 41 in the present embodiment is a hydraulic cylinder. The drive unit 41 in the embodiment includes a cylinder portion 411, a piston portion 412, a piston rod portion 413, an elastic member 414, and a rod guide portion 415.

The cylinder portion 411 has a hollow cylindrical shape and extends in the vertical direction Dv. In the cylinder portion 411, a cylinder chamber S that extends in the vertical direction Dv is formed. In the cylinder portion 411, control oil is accommodated. A bottom portion of the cylinder portion 411 in the present embodiment is positioned on the lower side in the vertical direction Dv such that the piston rod portion 413 protrudes upward in the vertical direction Dv.

The cylinder portion 411 in the present embodiment includes a cylinder main body 411a and a cylinder lid portion 411b. The cylinder main body 411a extends in the vertical direction Dv and has a bottomed tubular shape of which an upper side in the vertical direction Dv is open. The cylinder lid portion 411b is fixed to the upper side of the cylinder main body 411a in the vertical direction Dv. The cylinder lid portion 411b closes an open portion of the cylinder main body 411a. The cylinder lid portion 411b is fixed to the valve casing main body 211. In the cylinder lid portion 411b, a guide insertion hole 411c into which the rod guide portion 415, which will be described later, can be inserted is formed. The guide insertion hole 411c penetrates the cylinder lid portion 411b in the vertical direction Dv.

The piston portion 412 partitions the cylinder chamber S into a first chamber S1 that is on the upper side in the vertical direction Dv and a second chamber S2 that is on the lower side in the vertical direction Dv. The piston portion 412 is disposed inside the cylinder chamber S. The piston portion 412 moves in the vertical direction Dv. The entire circumference of the piston portion 412 can slide along an inner circumferential surface of the cylinder main body 411a and the position of the piston portion 412 relative to the cylinder main body 411a changes. Movement of the piston portion 412 changes the size of the first chamber S1 and the second chamber S2. The piston portion 412 is connected to the piston rod portion 413. When the piston portion 412 is moved to a first side in the cylinder chamber S, the intermediate valve body 28 is moved away from the intermediate valve seat portion 27. When the piston portion 412 is moved to a second side in the cylinder chamber S, the intermediate valve body 28 is moved to be closer to the intermediate valve seat portion 27.

The piston rod portion 413 is connected to the piston portion 412. The piston rod portion 413 moves along with the piston portion 412. The piston rod portion 413 extends from the piston portion 412 in the vertical direction Dv in a columnar shape. An upper end portion of the piston rod portion 413 in the vertical direction Dv, which is an end portion not connected to the piston portion 412, protrudes from the cylinder portion 411. The piston rod portion 413 is formed to have a length such that the upper end portion in the vertical direction Dv protrudes from the cylinder portion 411 even after the piston rod portion 413 is moved downward in the vertical direction Dv.

The elastic member 414 is disposed inside the first chamber S1. The elastic member 414 urges the piston portion 412 such that the piston portion 412 is pressed toward the lower side in the vertical direction Dv. The elastic member 414 is fixed to a surface of the cylinder lid portion 411b that faces the lower side in the vertical direction Dv and an end surface of the piston portion 412 that faces the upper side in the vertical direction Dv. As the elastic member 414 in the present embodiment, for example, a coil spring is used.

The rod guide portion 415 guides movement of the piston rod portion 413 in the vertical direction Dv. The rod guide portion 415 has a cylindrical shape into which the piston rod portion 413 can be inserted. The rod guide portion 415 is fixed to the cylinder lid portion 411b. An outer circumferential surface of the rod guide portion 415 is in close contact with an inner circumferential surface of the guide insertion hole 411c. An inner circumferential surface of the rod guide portion 415 is in sliding contact with an outer circumferential surface of the piston rod portion 413. A gap between the inner circumferential surface of the valve body rod insertion hole 631c and the outer circumferential surface of the intermediate rod portion 29 is formed to be wider than a gap between the inner circumferential surface of the rod guide portion 415 and the outer circumferential surface of the piston rod portion 413. One end portion of the rod guide portion 415 is disposed to protrude upward in the vertical direction Dv with respect to a cylinder lid. The other end portion of the rod guide portion 415 is disposed inside the cylinder chamber S. That is, a portion of the rod guide portion 415 is disposed inside the cylinder portion 411.

The linking unit 42 connects the intermediate rod portion 29 and the piston rod portion 413 to each other. The linking unit 42 converts displacement of the piston rod portion 413 in the first center axis direction D1 to displacement in the second center axis direction D2 and transmits the displacement to the intermediate rod portion 29 such that the intermediate rod portion 29 is moved in the second center axis direction D2. In other words, the linking unit 42 converts displacement of the piston rod portion 413 moving upward and downward in the vertical direction Dv into displacement in the width direction Dw such that the intermediate rod portion 29 is moved. The linking unit 42 in the present embodiment includes an intermediate rod-fixing portion 421, a first connection member 422, a second connection member 423, and a lid portion-fixing portion 424.

The intermediate rod-fixing portion 421 is fixed to an end portion of the intermediate rod portion 29 that is not connected to the slave valve body portion 61. The intermediate rod-fixing portion 421 is disposed to be separated outwardly from the lateral lid portion 212 in the width direction Dw. The intermediate rod-fixing portion 421 has a pillar-like shape that extends in the second center axis direction D2. The intermediate rod-fixing portion 421 covers a part of a portion of the intermediate rod portion 29 that protrudes outward from the lateral lid portion 212 in the width direction Dw. In the intermediate rod-fixing portion 421, a first fixation hole 421a and a second fixation hole 421b are formed.

The first fixation hole 421a is recessed in the width direction Dw from a surface of the intermediate rod-fixing portion 421 that faces the lateral lid portion 212 side (inner side in width direction Dw). An inner circumferential surface of the first fixation hole 421a is in sliding contact with an outer circumferential surface of the intermediate rod portion 29.

The second fixation hole 421b is further recessed in the width direction Dw from a bottom portion of the first fixation hole 421a. In other words, the second fixation hole 421b is formed at a deeper position than the first fixation hole 421a in the width direction Dw. The inner diameter of the second fixation hole 421b is smaller than the inner diameter of the first fixation hole 421a. The second fixation hole 421b is a screw hole at which the base end portion 290 of the intermediate rod portion 29 can be fixed. In other words, the base end portion 290 of the intermediate rod portion 29 is screwed into the second fixation hole 421b. In this manner, the intermediate rod-fixing portion 421 is fixed in a state of being unmovable relative to the intermediate rod portion 29.

The first connection member 422 connects the piston rod portion 413 and the intermediate rod-fixing portion 421 to each other. The first connection member 422 is a planar plate member. The first connection member 422 is connected to the upper end portion of the piston rod portion 413 in the vertical direction Dv in a state of being rotatable. The first connection member 422 is connected to an outer end portion of the intermediate rod-fixing portion 421 in the width direction Dw in a state of being rotatable. Here, a connection portion between the first connection member 422 and the piston rod portion 413 will be referred to as a first rotary connection portion A. In addition, a connection portion between the first connection member 422 and the intermediate rod-fixing portion 421 will be referred to as a second rotary connection portion B.

The second connection member 423 connects the first connection member 422 and the lid portion-fixing portion 424 to each other. The second connection member 423 is a planar plate member that is shorter than the first connection member 422. The second connection member 423 is connected to the vicinity of an intermediate portion of the first connection member 422 in a state of being rotatable. The second connection member 423 is fixed to the lid portion-fixing portion 424 in a state of being rotatable. The lid portion-fixing portion 424 is fixed to the lateral lid portion 212 such that the lid portion-fixing portion 424 is positioned outside the valve casing 21. In other words, the second connection member 423 is fixed to the lateral lid portion 212 via the lid portion-fixing portion 424. Here, a connection portion between the second connection member 423 and the first connection member 422 will be referred to as a third rotary connection portion C. In addition, a connection portion between the second connection member 423 and the lid portion-fixing portion 424 will be referred to as a fourth rotary connection portion D. Regarding the position of the fourth rotary connection portion D in the width direction Dw, the fourth rotary connection portion D is disposed at a position that overlaps the position of the first rotary connection portion A in the width direction Dw such that the fourth rotary connection portion D is disposed immediately above the piston rod portion 413 in the vertical direction Dv. Regarding the position of the fourth rotary connection portion D in the vertical direction Dv, the fourth rotary connection portion D is disposed at a position that overlaps the position of the second rotary connection portion B in the vertical direction Dv such that the fourth rotary connection portion D overlaps the intermediate rod portion 29.

As shown in FIG. 2, in the valve device 2 according to the present embodiment, the first outlet flow paths 53a function as adjusting valves by being opened and closed by means of the first outlet valve bodies 23a, so that the amount of steam supplied to the turbine main body 100 is adjusted. In addition, in the valve device 2, the second outlet flow path 53b functions as an overload valve by being opened and closed by means of the second outlet valve body 23b, so that the amount of steam supplied to the turbine main body 100 is adjusted. In addition, in the valve device 2, the intermediate flow paths 52 function as stop valves by being opened and closed by means of the intermediate valve bodies 28, so that supply of steam to the turbine main body 100 can be stopped.

Next, the operation of the valve device 2 configured as described above will be described. In the case of the steam turbine 1 as described above, at the time of a normal operation, the valve device 2 enters an opened state in order to cause steam to flow into the turbine main body 100 from the steam supply source 200 shown in FIG. 1.

In the case where the valve device 2 is in an opened state, the linkage shaft portion 26 shown in FIG. 2 is driven such that the outlet rod portions 25 are moved upward in the vertical direction Dv. Accordingly, the first outlet valve bodies 23a and the second outlet valve body 23b are also moved upward in the vertical direction Dv along with the inner bar 24. As a result, the first outlet valve bodies 23a are separated from the first outlet valve seat portions 22a and thus the first outlet flow paths 53a are opened. At the same time, the second outlet valve body 23b is separated from the second outlet valve seat portion 22b and thus the second outlet flow path 53b is opened.

Furthermore, not only the linkage shaft portion 26 but also the intermediate actuator units 30 are driven. Specifically, the amount of control oil is adjusted in the cylinder portions 411 shown in FIG. 5 such that the piston portions 412 are pressed by the control oil and are moved upward in the vertical direction Dv. When the piston portions 412 are moved, the piston rod portions 413 are also moved upward in the vertical direction Dv. When the piston rod portions 413 are moved, the first rotary connection portions A are moved upward in the vertical direction Dv and the first connection members 422 are moved upward in the vertical direction Dv while rotating. At this time, the lid portion-fixing portions 424 are fixed to the lateral lid portions 212. Therefore, the second connection members 423 connected to the first connection members 422 rotate around the fourth rotary connection portions D with respect to the lid portion-fixing portions 424. When the first connection members 422 are moved upward in the vertical direction Dv while rotating and the second connection members 423 rotate, the second rotary connection portions B are straightly moved outward in the width direction Dw along with the intermediate rod portions 29. When the intermediate rod portions 29 are moved outward in the width direction Dw, the intermediate valve bodies 28 are moved to be separated from the intermediate valve seat portions 27.

Figure 5:
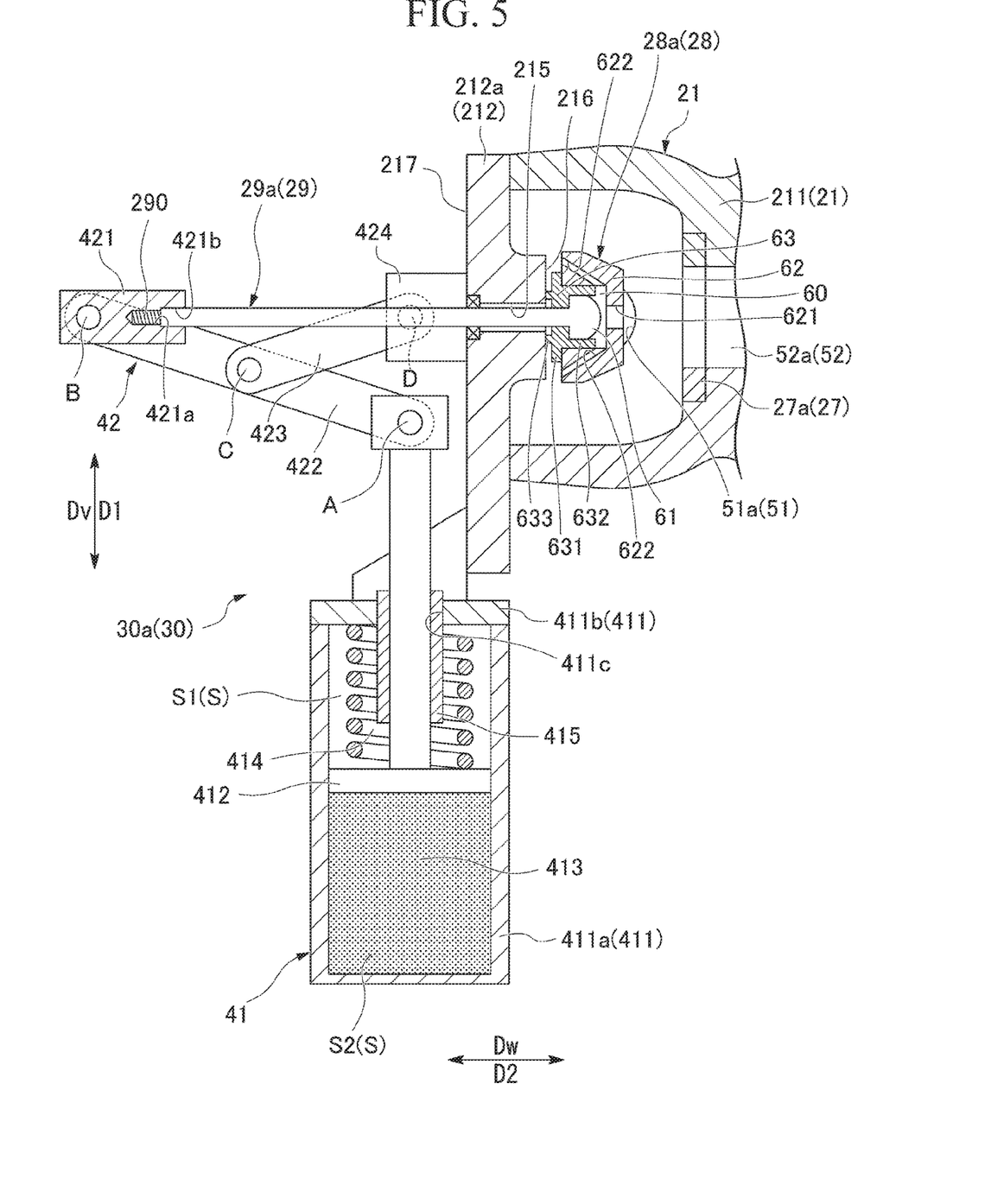
FIG. 5 is a main part enlarged view showing a fully-opened state of the valve device according to the embodiment.

Specifically, first, the slave valve body portions 61 connected to the intermediate rod portions 29 are moved outward in the width direction Dw to be separated from the first valve body through-holes 621. As a result, the outlet flow paths 53 and the inlet flow paths 51 partially communicate with each other via the first valve body through-holes 621, the accommodation spaces 60, and the second valve body through-holes 622. When the intermediate rod portions 29 are further moved outward in the width direction Dw in this state, the slave valve body portions 61 come into contact with the slave valve body guide main bodies 631. When the intermediate rod portions 29 are further moved outward in the width direction Dw, the slave valve body guide main bodies 631 are moved outward in the width direction Dw by being pressed by the slave valve body portions 61. As a result, the main valve body portions 62 fixed to the slave valve body guide main bodies 631 are also moved outward in the width direction Dw. Accordingly, the main valve body portions 62 are completely separated from the intermediate valve seat portions 27 and thus the intermediate flow paths 52 are opened. Therefore, with the first intermediate actuator unit 30*a* being driven, the first intermediate valve body 28*a* is separated from the first intermediate valve seat portion 27*a* and thus the first intermediate flow path 52*a* is opened. Similarly, with the second intermediate actuator unit 30*b* being driven, the second intermediate valve body 28*b* is separated from the second intermediate valve seat portion 27*b* and thus the second intermediate flow path 52*b* is opened.

In addition, in the case where the amount of steam supplied to the turbine main body 100 is to be reduced at the time of a normal operation, only the linkage shaft portion 26 shown in FIG. 2 is driven such that the outlet rod portions 25 are moved downward in the vertical direction Dv. Accordingly, the first outlet valve bodies 23*a* become closer to the first outlet valve seat portions 22*a* and thus the opening amounts of the first outlet flow paths 53*a* are reduced. At the same time, the second outlet valve body 23*b* becomes closer to the second outlet valve seat portion 22*b* and thus the opening amount of the second outlet flow path 53*b* is reduced.

At the time of emergency stoppage of the turbine main body 100 which is made when there is an abnormality in the turbine main body 100, the intermediate actuator units 30 and the linkage shaft portion 26 are driven. Specifically, contrary to the case where the intermediate flow paths 52 are to be opened, the piston portions 412 are moved downward in the vertical direction Dv. As a result, the intermediate rod portions 29 are moved inward in the width direction Dw by means of the linking units 42. When the intermediate rod portions 29 are moved inward in the width direction Dw, the intermediate valve bodies 28 are moved to become closer to the intermediate valve seat portions 27. As a result, as shown in FIG. 3, the intermediate valve body 28 comes into contact with the intermediate valve seat portion 27 and thus the intermediate flow path 52 is closed. Therefore, with the first intermediate actuator unit 30*a* being driven, the first intermediate valve body 28*a* comes into contact with the first intermediate valve seat portion 27*a* and thus the first intermediate flow path 52*a* is closed. Similarly, with the second intermediate actuator unit 30*b* being driven, the second intermediate valve body 28*b* comes into contact with the second intermediate valve seat portion 27*b* and thus the second intermediate flow path 52*b* is closed. At the same time, the linkage shaft portion 26 is driven such that the outlet rod portions 25 are moved downward in the vertical direction Dv. Accordingly, the first outlet valve bodies 23*a* and the second outlet valve body 23*b* are also moved downward in the vertical direction Dv along with the inner bar 24. As a result, the first outlet valve bodies 23*a* come into contact with the first outlet valve seat portions 22*a* and thus the first outlet flow paths 53*a* are closed. At the same time, the second outlet valve body 23*b* comes into contact with the second outlet valve seat portion 22*b* and thus the second outlet flow path 53*b* is closed.

According to the valve device 2 as described above, the intermediate actuator units 30 cause the piston rod portions 413 to move in the vertical direction Dv, which is a direction orthogonal to a movement direction of the intermediate rod portions 29. Therefore, in comparison with the case where the piston rod portions 413 moving in the width direction Dw are connected to outer sides of end portions of the intermediate rod portions 29 in the width direction Dw, it is possible to suppress the size of the valve device 2 in the width direction Dw. In addition, since the intermediate flow paths 52 are formed to be orthogonal to the outlet flow paths 53, it is possible to simplify the shape of a space inside the valve casing 21 in comparison with the case where the intermediate flow paths 52 and the outlet flow paths 53 are provided to be parallel with each other. Therefore, it is possible to improve an assembling property at the time of incorporation of the outlet valve seat portions 22, the outlet valve bodies 23, or the like into the valve casing 21. As a result, it is possible to achieve reduction in size of the valve device 2 while securing an assembling property. Accordingly, it is possible to achieve reduction in size of the entire steam turbine 1.

In addition, the gaps between the inner circumferential surfaces of the valve body rod insertion holes 631*c* and the outer circumferential surfaces of the intermediate rod portions 29 are formed to be wider than the gaps between the inner circumferential surfaces of the rod guide portions 415 and the outer circumferential surfaces of the piston rod portions 413. In other words, the intermediate rod portions 29 are inserted into the valve body rod insertion holes 631*c* in a wobbling state. Therefore, movement of the intermediate rod portions 29 being impeded due to adhesion of scale is suppressed.

Specifically, the valve body rod insertion holes 631*c* and the intermediate rod portions 29 are exposed to steam flowing in from the inlet flow paths 51. Therefore, after the steam turbine 1 is operated for a long period of time, scale generated due to steam is likely to adhere to the inner circumferential surfaces of the valve body rod insertion holes 631*c* or the outer circumferential surfaces of the intermediate rod portions 29. When gaps between the inner circumferential surfaces of the valve body rod insertion holes 631*c* and the outer circumferential surfaces of the intermediate rod portions 29 are excessively narrow in such a situation as in the case where the intermediate rod portions 29 are in sliding contact with the valve body rod insertion holes 631*c*, the gaps are clogged with scale. When the gaps are clogged with scale, movement of the intermediate rod portions 29 relative to the valve body rod insertion holes 631*c* is hindered. However, in the case where the gaps between the inner circumferential surfaces of the valve body rod insertion holes 631*c* and the outer circumferential surfaces of the intermediate rod portions 29 are widened, there is no portion that guides movement of the intermediate rod portions 29. As a result, it becomes difficult to move the intermediate rod portions 29 in the width direction Dw with high accuracy. With regard to this, in the present embodiment, the rod guide portions 415 which guide movement of the piston rod portions 413 are provided. Therefore, it is possible to stably move the piston rod portions 413 in the vertical direction Dv with high accuracy. Since the piston rod portions 413 are moved with high accuracy, it is possible to move the intermediate rod portions 29 in the width direction Dw with high accuracy without providing a structure for directly guiding movement of the intermediate rod portions 29. Accordingly, it is possible to secure movement of the intermediate rod portions 29 with high accuracy without being influenced by scale.

Furthermore, a portion of each of the piston rod portion 413 is disposed in the cylinder portion 411. Therefore, the piston rod portions 413 are exposed to control oil. As a result, control oil adheres to the outer circumferential surfaces of the piston rod portions 413 and thus sliding characteristics are significantly enhanced. Therefore, even when there is almost no gap between the inner circumferential surfaces of the rod guide portions 415 and the outer circumferential surfaces of the piston rod portions 413, a high slidability can be secured between the rod guide portions 415 and the piston rod portions 413. Accordingly, it is possible to stably move the piston rod portions 413 in the vertical direction Dv with high accuracy. As a result, it is possible to secure stable movement of the intermediate rod portions 29 or the piston rod portions 413 while securing an assembling property.

In addition, in the present embodiment, a portion of each of the rod guide portions 415 is disposed in the cylinder portion 411. Therefore, not only the piston rod portions 413 but also the rod guide portions 415 are exposed to control oil. As a result, control oil also adheres to the inner circumferential surfaces of the rod guide portions 415. Therefore, sliding characteristics are improved not only at the outer circumferential surfaces of the piston rod portions 413 but also at the inner circumferential surfaces of the rod guide portions 415. Accordingly, significantly high slidability can be secured between the rod guide portions 415 and the piston rod portions 413. Therefore, it is possible to more stably move the piston rod portions 413 in the vertical direction Dv with high accuracy.

In addition, when the intermediate rod portions 29 are moved outward in the width direction Dw such that the intermediate flow paths 52 are opened, the projection portions 633 protruding from the guide rear surfaces 631b come into contact with the lid portion inner surfaces 216. As a result, openings of the rod insertion holes 215 at the lid portion inner surfaces 216 are surrounded by the projection portions 633 brought into close contact with the lid portion inner surfaces 216 and the guide rear surfaces 631b. In other words, the projection portions 633 serve as sealing portions between the lateral lid portions 212 and the intermediate valve bodies 28. Accordingly, even when the intermediate flow paths 52 are opened and steam flows into the valve casing main body 211, inflow of steam into the rod insertion holes 215 can be suppressed. As a result, steam inside the valve casing main body 211 can be restrained from leaking out from the valve casing main body 211 via the rod insertion holes 215. Therefore, steam leaking into the atmosphere is reduced and it is possible to improve the efficiency of the steam turbine 1.

In addition, as shown in FIG. 3, in a state where the intermediate flow path 52 is closed by the intermediate valve body 28, a pressure difference is generated in the slave valve body portion 61 between the first valve body through-hole 621 side (side communicating with outlet flow path 53) and the accommodation space 60 side (side communicating with inlet flow path 51). Due to the pressure difference, a thrust force toward the inner side in the width direction Dw acts on the slave valve body portion 61 such that the slave valve body portion 61 is pressed against the first valve body through-hole 621. Therefore, when the intermediate rod portions 29 are to be moved outward in the width direction Dw such that the intermediate flow paths 52 are opened, the intermediate rod portions 29 are moved after forces against the thrust forces acting on the slave valve body portions 61 are applied first. When the intermediate rod portions 29 are moved and the slave valve body portions 61 are moved, the closed first valve body through-holes 621 are opened. As a result, the accommodation spaces 60 communicate with the outlet flow paths 53. The accommodation spaces 60 also communicate with the inlet flow paths 51 via the second valve body through-holes 622. Therefore, when the first valve body through-holes 621 are opened, the intermediate valve bodies 28 including the main valve body portions 62 are not influenced by pressure differences between sides communicating with the outlet flow paths 53 and sides communicating with the inlet flow paths 51. As a result, it is possible to move the intermediate rod portions 29 outward in the width direction Dw with a significantly small force in comparison with the case where each of the intermediate valve bodies 28 is simply formed by using a large single member of the main valve body portion 62. Therefore, a force necessary for movement of the intermediate rod portions 29 can be suppressed and thus the drive units 41 can have small-size structures.

In addition, in the case where the position of the centroid X of each main valve body portion 62 in the width direction Dw is shifted to be closer to the first valve body through-hole 621 side than the slave valve body guide portion 63, the main valve body portions 62 may be slightly inclined with respect to the slave valve body portions 61 when the slave valve body portions 61 become closer to the first valve body through-holes 621 relative to the slave valve body guide portions 63. When the main valve body portions 62 are inclined with respect to the slave valve body portions 61 connected to the intermediate rod portions 29 even slightly, the main valve body portions 62 are inclined with respect to intermediate valve seats as well. As a result, even when the main valve body portions 62 are brought into close contact with the intermediate valve seats to close the intermediate flow paths 52, there is a possibility that gaps are generated between the main valve body portions 62 and the intermediate valve seats and the intermediate flow paths 52 cannot be completely closed. With regard to this, in the present embodiment, the positions of the centroids X of the main valve body portions 62 overlap the slave valve body guide portions 63 in the width direction Dw. Therefore, even when the intermediate rod portions 29 are moved and the positions of the slave valve body portions 61 relative to the slave valve body guide portions 63 are shifted, the positions of the centroids X of the main valve body portions 62 in the width direction Dw do not become offset from the positions of the slave valve body guide portions 63 at all times. In other words, a state where the slave valve body portions 61 are stably supported with respect to the slave valve body guide portions 63 can be maintained. As a result, it is possible to prevent the main valve body portions 62 from being inclined with respect to the slave valve body portions 61. Accordingly, it is possible to stably close the intermediate flow paths 52 by means of the intermediate valve bodies 28.

In addition, in the intermediate rod-fixing portions 421, the first fixation holes 421a and the second fixation holes 421b are formed. The inner circumferential surfaces of the first fixation holes 421a are in sliding contact with the outer circumferential surfaces of the intermediate rod portions 29. The second fixation holes 421b are recessed from the bottom portions of the first fixation holes 421a and the base end portions 290 of the intermediate rod portions 29 are fixed to. In other words, the intermediate rod portions 29 are fixed to the second fixation holes 421b formed at deeper positions than the first fixation holes 421a in a state of being inserted into the first fixation holes 421a. Therefore, even if the base end portions 290 of the intermediate rod portions 29 are broken or the like and the base end portions 290 of the intermediate rod portions 29 and the second fixation holes 421b fixed to each other are released from each other, the intermediate rod portions 29 remain inserted into the first fixation holes 421a. Therefore, the intermediate rod portions 29 are restrained from falling out from the intermediate rod-fixing portions 421. As a result, even when the intermediate rod portions 29 and the intermediate rod-fixing portions 421 fixed to each other are released from each other, it is possible to press the intermediate rod portions 29 inward in the width direction Dw by moving the intermediate rod-fixing portions 421 inward in the width direction Dw. Accordingly, it is possible to close the intermediate flow paths 52 and thus it is possible to secure the reliability of the valve device 2.

In addition, unlike the case where the intermediate rod portions 29 and the piston rod portions 413 extend in the width direction Dw in a state of being connected to each other, it is possible to make the intermediate rod portions 29 the only members extending in the width direction Dw. As a result, it is possible to suppress the length of a member extending in the width direction Dw and to suppress the amount of bending caused by the gravity force. Accordingly, it becomes easy to adjust contact alignment between the intermediate valve bodies 28 and the intermediate valve seat portions 27 and thus it is possible to block main steam with high accuracy.

In addition, in the valve casing main body 211, the external opening portions 54 are formed outward of the intermediate flow paths 52 in the width direction Dw. Since the external opening portions 54 face the intermediate flow paths 52, when the inside of the valve casing main body 211 is seen from an outer side in the width direction Dw, a region in which the first outlet flow paths 53a and the second outlet flow path 53b are formed can be visually recognized. In other words, it is possible to easily insert a component such as the outlet valve seat portion 22 or the outlet valve body 23 into the region in which the first outlet flow paths 53a and the second outlet flow path 53b are formed via the external opening portions 54 from the outside. As a result, it is possible to improve the workability with respect to the vicinity of the outlet flow paths 53. In addition, since the external opening portions 54 are also close to the inlet flow paths 51 and the intermediate flow paths 52, it is also possible to easily insert a component into a region in which the inlet flow paths 51 and the intermediate flow paths 52 are formed. As a result, it is possible to improve a component assembling property in the vicinity of the inlet flow paths 51 and the intermediate flow paths 52. Therefore, it is not necessary to form the inlet flow paths 51, the intermediate flow paths 52, and the outlet flow paths 53 in different casings respectively and to integrally fix the casings by means of welding or the like. Therefore, it is not necessary to secure a region for welding and it is possible to reduce the size of the valve casing 21. As a result, it is possible to further reduce the size of the valve device 2.

Other Modification Examples of Embodiment

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Note that, one valve casing main body 211 may not be provided with the plurality of inlet flow paths 51, the plurality of intermediate flow paths 52, the plurality of outlet flow paths 53, and the plurality of external opening portions 54 as in the present embodiment. For example, one valve casing main body 211 may be provided with one inlet flow path 51, one intermediate flow path 52, one outlet flow path 53, and one external opening portion 54 and may be provided with a plurality of any of the inlet flow paths 51, the intermediate flow paths 52, the outlet flow paths 53, and the external opening portions 54.

In addition, the projection portions 633 may not be formed on the slave valve body guide portions 63 as in the present embodiment. The projection portions 633 only have to be formed at positions at which the projection portions 633 can come into contact with the lid portion inner surfaces 216 when the intermediate rod portions 29 are moved such that the intermediate flow paths 52 are opened. The projection portions 633 may be formed on the main valve body surfaces 623 (main valve body portions 62), for example.

EXPLANATION OF REFERENCES 1 steam turbine
100 turbine main body
200 steam supply source
2 valve device
Dw width direction
Dv vertical direction
D1 first center axis direction
D2 second center axis direction
21 valve casing
211 valve casing main body
51 inlet flow path
51a first inlet flow path
51b second inlet flow path
52 intermediate flow path
52a first intermediate flow path
52b second intermediate flow path
53 outlet flow path
53a first outlet flow path
53b second outlet flow path
54 external opening portion
54a first external opening portion
54b second external opening portion
212 lateral lid portion
215 rod insertion hole
216 lid portion inner surface
217 lid portion outer surface
212a first lateral lid portion
212b second lateral lid portion
213 upper lid portion
22 outlet valve seat portion 22a first outlet valve seat portion
22b second outlet valve seat portion
23 outlet valve body
23a first outlet valve body
23b second outlet valve body
24 inner bar
25 outlet rod portion
O1 first center axis
26 linkage shaft portion
27 intermediate valve seat portion
27a first intermediate valve seat portion
27b second intermediate valve seat portion
28 intermediate valve body
61 slave valve body portion
62 main valve body portion
60 accommodation space
621 first valve body through-hole
622 second valve body through-hole
623 main valve body surface
X centroid
63 slave valve body guide portion
631 slave valve body guide main body
631a guide front surface
631b guide rear surface
631c valve body rod insertion hole
632 guide tubular portion
633 projection portion
28a first intermediate valve body
28b second intermediate valve body
29 intermediate rod portion
O2 second center axis
29a first intermediate rod portion
29b second intermediate rod portion
290 base end portion
30 intermediate actuator unit
30a first intermediate actuator unit
30b second intermediate actuator unit
41 drive unit
411 cylinder portion
S cylinder chamber
S1 first chamber
S2 second chamber
411a cylinder main body
411b cylinder lid portion
411c guide insertion hole
412 piston portion
413 piston rod portion
414 elastic member
415 rod guide portion
42 linking unit
421 intermediate rod-fixing portion
421a first fixation hole
421b second fixation hole
422 first connection member
423 second connection member
424 lid portion-fixing portion
A first rotary connection portion
B second rotary connection portion
C third rotary connection portion
D fourth rotary connection portion

What is claimed is:

1. A valve device comprising:
a valve casing in which an inlet flow path into which fluid is configured to flow, an intermediate flow path that communicates with the inlet flow path and through which the fluid is configured to flow in a direction intersecting the inlet flow path, and an outlet flow path that communicates with the intermediate flow path and through which the fluid is configured to flow in a direction intersecting the intermediate flow path are formed;
an outlet valve seat portion provided in the outlet flow path;
an outlet valve body that comes into contact with the outlet valve seat portion such that the outlet flow path is closed;
an outlet rod portion that extends along a first center axis and of which an end portion on a first side in a first center axis direction is connected to the outlet valve body;
a linkage shaft portion that is configured to linearly move the outlet rod portion in the first center axis direction;
an intermediate valve seat portion provided in the intermediate flow path;
an intermediate valve body that comes into contact with the intermediate valve seat portion such that the intermediate flow path is closed;
an intermediate rod portion that extends along a second center axis intersecting the first center axis and of which an end portion on a first side in a second center axis direction is connected to the intermediate valve body; and
an intermediate actuator unit that is configured to linearly move the intermediate rod portion in the second center axis direction,
wherein the intermediate actuator unit includes
a hydraulic cylinder that configured to cause a piston rod portion to advance and retreat in a direction orthogonal to the second center axis direction, and
a linking unit that connects the intermediate rod portion and the piston rod portion to each other, converts displacement of the piston rod portion into displacement in the second center axis direction, and transmits the displacement to the intermediate rod portion such that the intermediate rod portion is moved in the second center axis direction,
wherein a rod insertion hole into which the intermediate rod portion is inserted is formed in the valve casing,
wherein the hydraulic cylinder includes
a cylinder portion in which control oil is accommodated, and
a rod guide portion that has a tubular shape into which the piston rod portion is inserted and guides movement of the piston rod portion, and
wherein a gap between an inner circumferential surface of the rod insertion hole and an outer circumferential surface of the intermediate rod portion is formed to be wider than a gap between an inner circumferential surface of the rod guide portion and an outer circumferential surface of the piston rod portion.

2. The valve device according to claim 1,
wherein at least a portion of the rod guide portion is disposed inside the cylinder portion.

3. The valve device according to claim 1,
wherein the valve casing includes a first surface in which the rod insertion hole is formed at a position facing the intermediate valve seat portion,
wherein the intermediate valve body includes
a valve body rear surface that faces the first surface and to which the intermediate rod portion is connected, and a projection portion that has a tubular shape surrounding a center axis of the intermediate rod portion and protrudes toward the first surface from the valve body rear surface, and wherein the projection portion comes into contact with the first surface when the intermediate rod portion is moved such that the intermediate flow path is opened.

4. The valve device according to claim 1, wherein the intermediate valve body includes
- a slave valve body portion that is fixed to a tip end of the intermediate rod portion,
- a main valve body portion in which an accommodation space accommodating the slave valve body portion is formed and that includes a valve body through-hole through which the accommodation space and the outlet flow path communicate with each other, and
- a slave valve body guide portion that is fixed to the main valve body portion and guides movement of the slave valve body portion in the accommodation space, and wherein a centroid of the main valve body portion is positioned to overlap the slave valve body guide portion in a movement direction of the slave valve body portion.

5. The valve device according to claim 1, wherein the linking unit includes an intermediate rod-fixing portion to which the intermediate rod portion is fixed, and wherein the intermediate rod-fixing portion includes
- a first fixation hole that is formed such that an inner circumferential surface thereof comes into sliding contact with the outer circumferential surface of the intermediate rod portion, and
- a second fixation hole that is recessed from a bottom portion of the first fixation hole and to which a base end portion of the intermediate rod portion is fixed.

6. A steam turbine comprising:

the valve device according to claim 1; and a turbine main body that is driven by means of steam supplied from the valve device.

\* \* \* \* \*